(12) United States Patent
Rudy (10) Patent No.: US 11,406,092 B1
(45) Date of Patent: Aug. 9, 2022

(54) EYELESS, KNOTLESS, COLORABLE AND/OR TRANSLUCENT/TRANSPARENT FISHING HOOKS WITH ASSOCIATABLE APPARATUS AND METHODS

(76) Inventor: Christopher John Rudy, Arlington, VA (US)

( * ) Notice: Subject to any disclaimer, the term of this patent is extended or adjusted under 35 U.S.C. 154(b) by 0 days.

(21) Appl. No.: 07/425,360

(22) Filed: Oct. 21, 1989

Related U.S. Application Data (63) Continuation of application No. 07/180,041, filed on Apr. 11, 1988, now abandoned.

(51) Int. Cl.
  A01K 83/00 (2006.01)
  A01K 99/00 (2006.01)
  A01K 85/01 (2006.01)

(52) U.S. Cl.
  CPC ............ *A01K 83/00* (2013.01); *A01K 85/011* (2022.02); *A01K 99/00* (2013.01)

(58) Field of Classification Search
  CPC ....... A01K 83/00; A01K 99/00; A01K 85/011
  USPC ................ 43/43.16, 42.32, 44.82, 44.83, 4.5
  See application file for complete search history.

(56) References Cited

U.S. PATENT DOCUMENTS

| | | | |
|---|---|---|---|
| 13,649 A | 10/1855 | Johnson | 43/4.5 |
| 842,594 A | 1/1907 | Van Vleck et al. | |
| 1,340,677 A | 5/1920 | Whitehead | 43/4.5 |
| 1,430,626 A | 10/1922 | Christensen | |
| 1,513,400 A | 10/1924 | Koski | |
| 2,699,751 A | 1/1955 | Hasler et al. | 43/4.5 |
| 3,564,749 A * | 2/1971 | Fuji | 43/43.16 |
| D222,833 S | 1/1972 | Fujii et al. | D22/30 |
| D252,818 S | 9/1979 | Cope | D22/28 |
| D255,043 S | 5/1980 | Lapetina | D22/27 |
| D260,923 S | 9/1981 | Cope | D22/28 |
| 6,775,944 B1 | 8/2004 | Jones, Jr. | 43/4.5 |
| 7,243,457 B1 | 7/2007 | Smith et al. | 43/4.5 |
| 8,756,821 B2 | 6/2014 | Lupovka | |
| 8,938,906 B2 | 1/2015 | Hey et al. | 43/4.5 |
| 9,044,041 B2 | 6/2015 | Miller et al. | 43/4.5 |
| 9,055,522 B2 | 6/2015 | Yang et al. | |
| 9,055,529 B2 | 6/2015 | Shih | |

FOREIGN PATENT DOCUMENTS

| | | |
|---|---|---|
| GB | 21260 | 1/1904 |
| GB | 21260 A * | 8/1905 |
| GB | 1204223 | 9/1970 |
| NO | 39388 | 7/1924 |

OTHER PUBLICATIONS

*Technology Illustrated*, Premier Issue, Oct./Nov. 1981, p. 78.
Dalrymple, "How to Rig and Fish Natural Baits," Funk & Wagnalls, New York (1976) pp. 8-9.
Mayes, "How to Make and Repair Your Own Fishing Tackle," Dodd, Mead & Co., New York (1986) pp. 10-11.

(Continued)

*Primary Examiner* — Darren W Ark (57) ABSTRACT

Provided are titled fish hooks and methods and apparatus for making them and for using them and other fish hooks as well. The method and apparatus for the use is in fishing, and they take advantage of or discern unobtrusive colors, shades or colorless quality of the fish hooks to fish. A Braille apparatus for fishing is also provided.

25 Claims, 2 Drawing Sheets

(56) References Cited

OTHER PUBLICATIONS

Nixon, "Fly Tying and Fly Fishing for Bass and Panfish," A.S. Barnes and Co., Cranberry, N.J. (1968) pp. 47-50.
"The Encyclopedia Americana, International Edition," vol. 18 (M to Mexico City), Grolier Inc., Danbury, Conn. (1990) p. 756.
McKechnie et al. (Eds.), "Webster's New Universal Unabridged Dictionary, Deluxe Second Edition," Dorset & Baber (1983) pp. 873-874 & 1076.
Halliday & Resnick, "Fundamentals of Physics, Revised Printing," John Wiley & Sons, Inc. (1974) pp. 669-672 & 697.
1992 Eagle Claw Gazette, Wright & McGill Co.
McKechnie et al . (Eds.), "Webster's New Universal Dictionary, Deluxe Second Edition," Dorset & Baber, 1983, p. 1046.
LARVA LACE Fly Tying Body Materials Applications Brochure, Body Material Trade Dress (Reverse) with six samples, and 1993-94 Catalog, p. 4, Inter Tac, Woodland Park CO.
Eagle Claw News Gazette, Wright & McGill Co., Denver CO (1992).
Trade Dress, Gary Kretchmer's HOT HOOKS ™, Hawg Wied Enterprises, Altoona, WI 54720 (with sample), Purchased May 30, 1994.
Class 43 Fishing, Traping, and Verman Destroying, Listing, May 2005, obtained online Jun. 11, 2015.
Class 43 Classification Definitons, May 2005, p. 43-2, obtained online Jun. 11, 2015.
USPTO Patent Full-Text and Image Database, 6 sheets, CCL/"43/45," Jun. 11, 2015, all 282 hits.
USPTO Patent Full-Text and Image Database, hits 1-50 out of 13456, ACLM/observing, Jun. 12, 2015.
USPTO Patent Full-Text and Image Database, hits 1-50 out of 236318, ACLM/measuring, Jun. 12, 2015.
USPTO Patent Full-Text and Image Database, hits 1-50 out of 315582, ACLM/selecting, Jun. 12, 2015.
USPTO Patent Full-Text and Image Database, hits 1-50 out of 319, ACLM/observing and ACLM/measuring and ACLM/selecting, Jun. 12, 2015.

* cited by examiner

| MUDDY | P/B | O | | O/Y | |
|---|---|---|---|---|---|
| STAINED | | G/GY | GY | | CL |
| CLEAR | G/R | R | | Y/CL | B |
| 0 | | | | | 100 |

Fig. 9

EYELESS, KNOTLESS, COLORABLE AND/OR TRANSLUCENT/TRANSPARENT FISHING HOOKS WITH ASSOCIATABLE APPARATUS AND METHODS

This is a continuation of application Ser. No. 07/180,041 filed Apr. 11, 1988, i.e. Apr. 11, 1988 A.D., abandoned.

FIELD

This invention concerns fishing hooks, useful as fishing tackle. Also of concern are associatable apparatus and methods, useful for preparing the hooks or fishing therewith.

BACKGROUND

Fishing hooks are an indispensable item of common fishing tackle assortments. In hook and line-type fishing, it is the hook which generally secures the taking of any fish, and yet, it is the hook itself which can be or contribute to being an obstacle to such taking. Fishing hooks in general, and especially those which are disintegrated from but which may otherwise be connectable to fishing lures, are known to be made of metal. See, e.g., Crosby, U.S. Pat. No. 59,893 (Nov. 20, 1866); Pfaff, U.S. Pat. No. 356,661 (Jan. 25, 1887), and Flower, U.S. Pat. No. 4,028,838 (Jun. 14, 1977). Common colors thereof include black, grey, silvery white, blue and golden. See, e.g., Eagle Claw® News Gazette (1988). The mid-1980s saw red metal fish hooks used in the Pacific Northwest for Salmon fishing. A purple colored metal hook has been reported to have been part of prior art. Unlike fishing lures though, which are intended and thus designed to be generally employed in methods and/or with apparatus for attracting fish, seeing, e.g., Hill, U.S. Pat. No. 4,599,820 (Jul. 15, 1986) and U.S. Pat. No. 4,693,028 (Sep. 15, 1987), describing methods and apparatus for selecting fishing lure color, fishing hooks need not themselves serve such an attracting intent or purpose, and, in fact, it may be highly advantageous to have a certain quality of unobtrusiveness associated with the fishing hooks. One type of fishing lure, in imitation of an insect or the like is known to have a body portion wholly formed of translucent plastic material, and a hook structurally integral with said body, the hook and body constituting a single piece, the hook portion described as being able to be made so that it will be translucent and scarcely able to be detected. See, Loeb, U.S. Pat. No. 2,511,117 (Jun. 13, 1950). Also, although of times not a most critical consideration, metal or certain other materials may impart a sensation to particular fish akin to smell or taste, which nonetheless may on certain occasions undesirably deter such fish from striking. Thus, many a strike may bypass the angler. Then, too, the hook must be connected to the line. More than one angler has experienced losing a catch after a strike due to an improperly tied knot, the knot being typically tied about the eye of the hook.

SUMMARY

The invention herein provides eyeless, knotless, colorable and/or translucent/transparent fishing hooks. Associatable with the same are (A) apparatus for (1) making said hooks, which employ the same, and (2) employing fishing hooks to include said hooks for fishing with the same, which communicates a color or shade of same less attractive to fish under water conditions at hand, and (B) methods for (1) making said hooks with means and by steps sufficient to make the same, which can include use of said first apparatus of this invention, and (2) using fishing hooks to include said hooks with means and/or by steps for fishing, which can include use of said second apparatus of this invention.

Hereby, the art of hook and line-type fishing is significantly advanced as one or more of such known obstacles to more effective angling can be reduced or even essentially eliminated by use of this invention. For instance, the circumstance of a fish undesirably sighting the fishing hook can be substantially reduced if not generally eliminated with the appropriately translucent/transparent, colored and/or shaded fishing hook embodiments and appropriate associatable inventive method and/or apparatus embodiments of this invention. Further, because of such reduction or elimination, fish-catching by hook and line-type methods may be improved greatly beyond that attributable to this effect alone, as the angler can now avoid such concerns in bait setting, especially setting of natural-type baits, as variously disguising significantly visible fishing hooks from fish with the bait, which can lead to setting of a less visibly alluring bait configuration. Instead, the angler can now focus on setting a visibly more alluring bait configuration itself. In addition, said hooks of this invention may be able to avoid imparting an undesirable sensation to particular fish akin to smell or taste. Then, too, knot tying and consequent loss of fish by improper knot tying can be avoided if desired. Also, the fishing hooks of this invention and/or the apparatus of this invention for using the fishing hooks in the inventive methods herein for fishing may be commercially appealing to anglers. Yet further advantages of this invention are apparent from the further disclosure herein.

DRAWINGS OF SOME INVENTION EMBODIMENTS

The drawings form a part of the specification hereof.

FIGS. 1PA-4PA represent prior art, pictorially illustrating lures in imitation of an insect or part of an insect to include an insect body, lures thus having their hook portions formed integrally with their body portions:

FIG. 1PA is a side elevational view of a fishing lure embodying the aforementioned patent to Loeb, the lure as shown being in the form of a mayfly. In FIG. 1PA are seen body portion 10, wings 11, legs 12, tail 13, the body 10 made of a translucent plastic material, and integrally formed therewith is the hook 14 having point 15 and barb 16; head 17 and markings 21 are seen.

FIG. 2PA is an elevational view of the body portion of the lure of FIG. 1PA. In FIG. 2PA are seen, in addition to features seen in FIG. 1PA, opening 18 by which the lure may be secured therethrough to the line; small openings 19 into which the legs 12 may be inserted and secured; and central recess or slot 20, opening through its upper side, in which ends of the members of the tail 13 may be inserted.

FIG. 3PA is a fragmentary sectional view of the tail portion of the body shown in FIG. 2PA. In FIG. 3PA are seen more of some of the features seen in FIG. 2PA.

FIG. 4PA is a side elevational view of the lure of the aforementioned patent to Loeb in the form of a typical dry fly.

In FIG. 4PA are seen body portion 35 of plastic material; hook 36 integrally formed therewith, also of translucent material; wings 37; hackle 38; and tail members 39.

FIGS. 1-9 pictorially illustrate some invention embodiments:

In FIG. 1, fishing hook 101 has barb 102, bend 103, shaft 104, and line socket 105. The line socket 105 includes a top orifice 106, a cylindrical side wall 107, and a circular disclike base 108.

In FIG. 2, top portion of fishing hook shaft 204 has line socket 205. The line socket 205 includes a cylindrical side wall 207 and a circular disclike base 208. Fishing line 209 is positioned within the line socket 205.

In FIG. 3, top portion of fishing hook shaft 304 has barbed line socket 305. The barbed line socket includes a top orifice 306, a side wall having barbs protruding basewardly therefrom 307, and a circular disclike base 308.

In FIG. 4, top portion of fishing hook shaft 404 has threaded line socket 405. The threaded line socket 405 includes a top orifice 406, a cylindrical side wall having a helical ridge protruding therefrom 407, and a circular disclike base 408.

In FIG. 5, fishing hook 501 has point 502, bend 503, shaft 504, and baseless line socket 505. The baseless line socket 505 includes a top orifice 506, a cylindrical side wall 507, and a bottom orifice 508. Grippable flange 510 is present about the baseless line socket 505.

In FIG. 6, fishing hook 601 has point 602, bend 603, squarelike shaft 604, and line trough 605. Supplemental flange material 610 not only increases strength about the bend 603 but also provides a better grip and so forth as well.

In FIG. 7, gang fishing hook 701 has multiple points 702 and so forth.

In FIG. 8, use is made of the chart with generally nonfluorescent colors or shades and so forth, purple, i.e., P, blue, i.e., B, green, i.e., G, yellow, i.e., Y, orange, i.e., O, red, i.e., R, grey, i.e., Gy, and colorless, i.e., Cl, under each fishing condition of water clarity and light intensity for selecting transparent, colored or shaded fishing hooks in accordance with preferred practice of this invention.

In FIG. 9, the linear chart of FIG. 8 is portrayed in arcuate band form so that the angler can obtain an indication as by visualization or by touch as in Braille of the fishing hooks which should be used in accordance with preferred practice of this invention. The dial and lettering are upstanding.

DETAIL

Provided are the titled fish hooks and methods and apparatus for making the same and using the same and other fish hooks as well. The method and apparatus for said use is in fishing, and they take advantage of or discern unobtrusive colors, shades or colorless quality of the fish hooks to fish. A Braille apparatus for fishing is also provided.

Each United States Patent mentioned anywhere in the specification hereof is incorporated herein by reference. The purposes for these incorporations are apparent to those appropriately skilled in the pertinent or most nearly connected arts from reading the description herein.

The term, "eyeless," herein means that the fishing hook lacks a conventional eye. The eyeless fishing hooks for the purpose of line attachment can have a line socket, which may advantageously be, illustratively, cylindrical, barbed and/or threaded and be based or baseless, have a line channel, or simply have an unmodified shaft, and so forth and the like. Baseless sockets have at least two orifices for ingress and egress of fishing line and generally have a distance between one such orifice and the other greater than the maximal cross sectional width available at the orifices for passage of the fishing line therethrough. Illustratively thus, if one such orifice defines a circular boundary with a diameter of $1/16$ of an inch, and the other such orifice defines a circular boundary with a diameter of $3/32$ of an inch, the distance between these two orifices must be greater than about $3/32$ of an inch for the baseless socket to be defined. Desirably, this distance is at least about twice said width, more so about from three to fifty times said width, say, about seven times said width. Line channels are akin to small troughs.

Fishing line can be attached to the eyeless or generally any appropriate fishing hooks by appropriate methods, as the artisan appreciates. Knotless methods may be employed in conjunction with and to provide the knotless fishing hooks of this invention. For example, suitable glue can be applied to line sockets or channels, which can adhesively bind the hook and line together. The glue can advantageously be one of those which contain cyanoacrylate and so forth and the like. Wedges can be positioned into place, for example, near to a line socket orifice, in order to hold the fishing hook and line together. Glue may be additionally employed with the wedges. The adhesive can involve such nylon bonding as in the so-called Super Snells™ of the Wright & McGill Co., Denver, Colo., U.S.A. Simple insertion, screwing or twisting of the fishing line into the barbed and threaded fishing hooks of this invention can be employed respectively in order to attach the fishing line to these fishing hooks. Alternatively, knots may be tied in order to hold the hook and line together, as appropriate.

The fishing hooks of this invention can be colored, shaded or colorless, i.e., they are colorable. Advantageously, any colors employed can be those which are less attractive to fish under fishing conditions, preferably least attractive to fish under fishing conditions. Also, any colors can be those which are attractive to anglers, of course, say, red. Colors can be incorporated by known methods, for example, by use of dyes in glass or plastic hooks, or less desirably by painting. Shades are encompassed within the term, "color," in general, herein.

Included is an eyeless, knotless, colorable, and/or transparent or translucent fishing hook, which is disintegrated from but is otherwise connectable or connected to a fishing lure or other tackle in the event that the hook is not transparent or translucent, and which is not black, grey, silvery white, blue, golden, red or purple in the event that the hook is made of metal. Thus, the hooks may be opaque.

The fishing hooks of this invention can be translucent.

The fishing hooks of this invention can be transparent. This can be accomplished by employing such materials as cast glass or a transparent plastic, for example, a polycarbonate, and so forth and the like, in manufacture of same. Colors or shades may be incorporated with the transparent hooks, or they may be colorless. It may be desirable, especially to some of those skilled in the art, to employ a material having an index of refraction somewhat near to that of water, but this may not be necessary for the practice of this invention.

The fishing hooks of this invention may be embodied in sundry forms and designs, to include single hooks, multiple hooks, and gang hooks. Preferably, the fishing hooks of this invention are disintegrated from but are otherwise connectable to fishing lures. Not a part of the articles of manufacture of this invention are such known hooks and lures as those of the foregoing Crosby, Pfaff, Flower, and Loeb patents as explicitly described therein, i.e., in their designs and with their preferred materials together, or of the metal hooks in the foregoing Eagle Claw® News Gazette reference, hereby incorporated by reference as well, or the aforementioned red and purple metal hooks.

However, the methods of this invention may use known fishing hooks. Nonetheless, preferably the methods for fishing of this invention use the fishing hooks of this invention therein.

The fishing hooks of this invention may be made by known methods, or methods analogous thereto, with appropriate apparatus and materials. See, e.g., Cummins, U.S. Pat. No. 2,924,046 (Feb. 9, 1960); Slayter, U.S. Pat. No. 2,951,316 (Sep. 6, 1960); Tingley, U.S. Pat. No. 3,162,522 (Dec. 22, 1964), and Lewis et al., U.S. Pat. No. 4,046,540 (Sep. 6, 1977), for glass; also, Hill, U.S. Pat. No. 1,980,483 (Nov. 13, 1934); Eig, U.S. Pat. No. 3,641,870 (Feb. 15, 1972); Moran et al., U.S. Pat. No. 4,083,896 (Apr. 11, 1978); Clodfelter et al., U.S. Pat. No. 4,137,351 (Jan. 30, 1979); Mertwoy et al., U.S. Pat. No. 4,195,144 (Mar. 25, 1980); Keskkula et al., U.S. Pat. No. 4,366,289 (Dec. 28, 1982); Moore et al., U.S. Pat. No. 4,505,972 (Mar. 19, 1985); Keskkula et al., U.S. Pat. No. 4,508,871 (Apr. 2, 1985); Aliberto et al., U.S. Pat. No. 4,517,339 (May 14, 1985); Leonard, U.S. Pat. No. 4,603,160 (Jul. 29, 1986); Wenzel et al., U.S. Pat. No. 4,636,458 (Jan. 13, 1987); Priddy, U.S. Pat. No. 4,647,632 (Mar. 3, 1987); Leonard, U.S. Pat. No. 4,650,821 (Mar. 17, 1987); Newman-Evans, U.S. Pat. No. 4,680,341 (Jul. 14, 1987); Dean, U.S. Pat. No. 4,696,978 (Sep. 29, 1987); Goel, U.S. Pat. No. 4,696,992 (Sep. 29, 1987); Ude et al., U.S. Pat. No. 4,696,993 (Sep. 29, 1987); Peters, U.S. Pat. No. 4,696,995 (Sep. 29, 1987); Billmeyer, Jr., *Textbook of Polymer Science, Second Edition*, John Wiley & Sons, Inc., New York (1971); *Guide to Plastics, Property and Specification Charts*, McGraw-Hill, Inc., New York (1975), for plastics; and so forth for additional methods and materials known to the artisan. The materials employed are selected to be of suitable properties for the fishing hooks of this invention, to include suitable strength, hardness, yet toughness, and so forth, as can be found in general in the wire fishing hooks. A desirable property is a transparent quality for the materials used for the fishing hooks of this invention. Generally suitable materials include thus those represented by glass, especially cast glass, and such plastics as, for example, hompolymers or copolymers with nylons, acrylates, to include, e.g., polymethylmethacrylate, polystyrenes, polypropylenes and polycarbonates, to include, e.g., allyl diglycol carbonate, and so forth and the like. Molding apparatus and methods are preferred. Milling and machining may be used as well.

Figure 1:
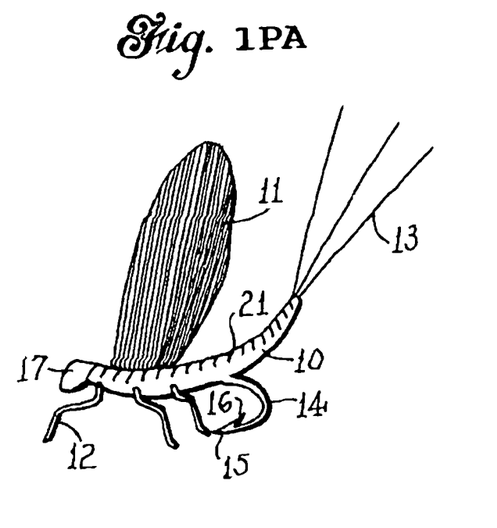
FIG. 1 in general is an oblique perspective view of a fishing hook within the spirit of this invention.
Figures 1, 2, 3, 4, 5, 6, 7:
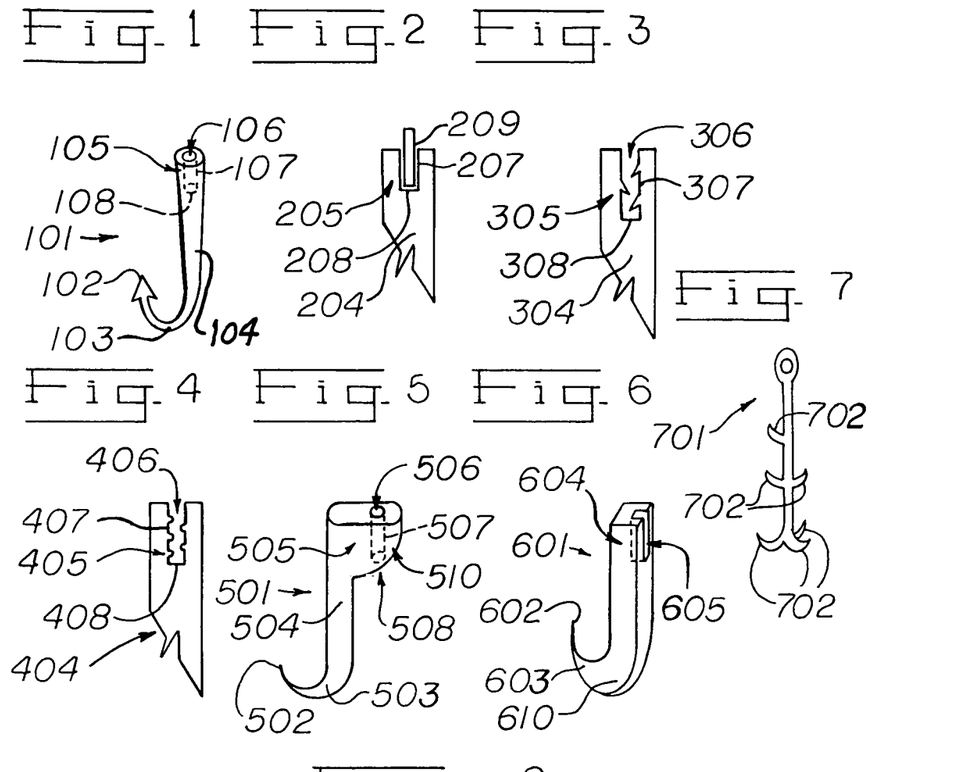
FIG. 2 in general is a side view of a cutaway portion of a fishing hook, with attachable fishing line positioned therein, within the spirit of this invention.
FIG. 3 in general is a side view of a cutaway portion of a fishing hook within the spirit of this invention.
FIG. 4 in general is a side view of a portion of a fishing hook within the spirit of this invention.
FIG. 5 in general is an oblique perspective view of a fishing hook within the spirit of this invention.
FIG. 6 in general is an oblique perspective view of a fishing hook within the spirit of this invention.
FIG. 7 in general is an oblique perspective view of a fishing hook within the spirit of this invention.
Figure 2:
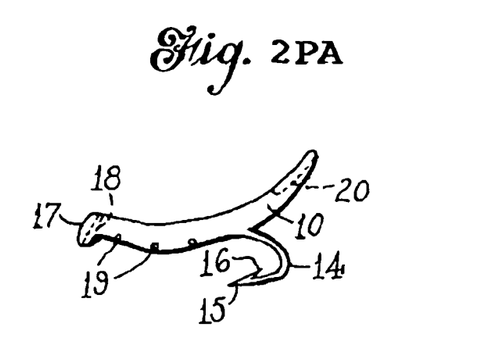
Figure 3:
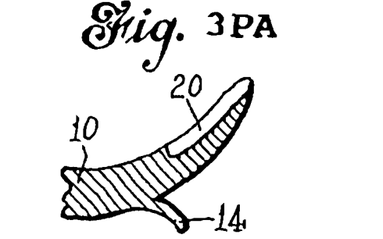
Figure 4:
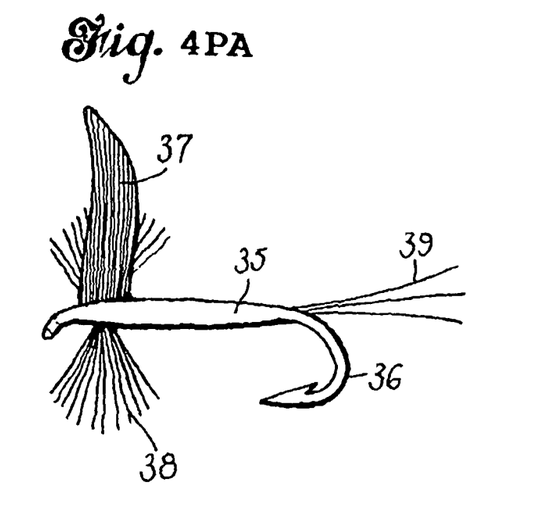
Figure 8:
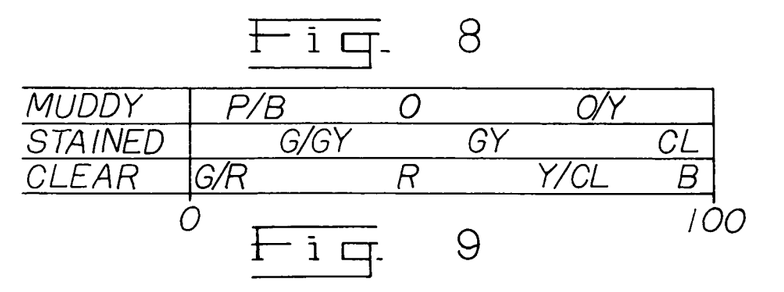
FIG. 8 in general is a linear chart within the spirit of this invention, made up of a plurality of horizontal bands of generally contiguous colors or shades and so forth, which illustrates the colors or shades which are believed to be least attractive to such fish as, for example, bass.
Figure 9:
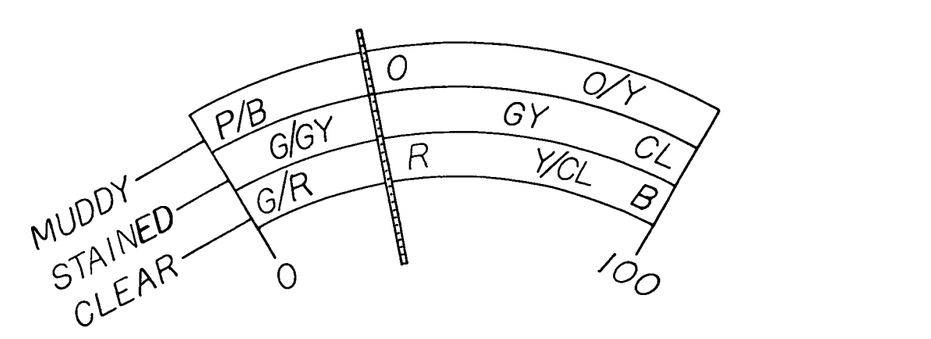
FIG. 9 in general illustrates in elevation an instrument or an attachable faceplate, for example, a decal, therefor within the spirit of this invention.

The fishing hooks of this invention can be used for fishing. In methods for fishing, as alluded to previously, with the same and with known fishing hooks as well, in one embodiment thereof, advantageously the fishing hook(s) is(are) selected which is(are) less attractive to fish under fishing conditions of water clarity, light intensity, any color of the water and so forth, as the artisan understands. Colorless, transparent fishing hooks may thus be selected. Alternatively, colored or shaded fishing hooks may be so selected. The selection can be one based on instinct or personal experience of the angler, or it may employ the selection of colors, shades and so forth and the like in contrast to the colors, etc., which are selected in the foregoing two Hill patents describing methods, i.e., a method for fishing comprising steps of (1) observing clarity of water to be fished to determine whether the water is clear, stained or muddy, (2) measuring light transmittance at depth in the water where a fishing hook is to be placed, and then (3) selecting a colored or colorless quality of the fishing hook to be used by matching the observed water conditions ((1) and (2)) with a color or colorless quality which has been previously determined to be less attractive to fish under said conditions than those pointed out by the following correlation for fish-attractive non-fluorescent colors:

| Water Condition | % Light Transmittance, ie., light intensity at fishing depth as a percentage of light intensity at surface on a clear noon summer day | | | | | | | | | | |
|---|---|---|---|---|---|---|---|---|---|---|---|
| | 0% | 10% | 20% | 30% | 40% | 50% | 60% | 70% | 80% | 90% | 100% |
| Clear: | Black | White | Yellow Blue | Blue | Purple | Silver Green | Green | Gray | Gold | Red | Red |
| Stained: | Black | White Black | Black Yellow | Gold | Orange | Red | Silver | Blue | Purple Green | Green | Gray |
| Muddy: | Black | Orange | Yellow | Yellow Silver | Silver White | Red White | Red Gold | Green | Gray Blue | Purple | Black, | and apparatus for selecting fishing lure color, and one such inventive scheme for use of the fishing hooks is pictorially illustrated by FIGS. 8-9 herein. The Secchi disc, light intensity meter, and so forth and the like noted in the foregoing two Hill patents can be thus used with the present invention as well.

Accordingly, the apparatus for employing fishing hooks, especially including those of this invention, for fishing as, for example, pictorially illustrated by the FIGS. 8-9 herein can be employed in conjunction with such methods for fishing as the angler artisan appreciates. The apparatus embodiments of this invention appropriately contrast in the communication provided to the angler from that of the two Hill patents describing methods and apparatus for selecting fishing lure color, but otherwise the apparatus embodiments for employing fishing hooks of this invention have such basic features as those generally described in these two Hill patents, save perhaps the Braille features, etc., which are disclosed herein and are readily made by the artisan for provision of same to such anglers as those with limited eyesight.

Many advantages accordingly attend this invention.

EPILOGUE

Eyeless, knotless, colorable and/or translucent/transparent fishing hooks with associatable apparatus and methods and so forth and the like are thus provided. Sundry modifications and adaptations can be made by the artisan, to include the ordinary artisan, within the spirit of this invention, the scope of which is particularly pointed out by the following distinctly claimed subject matter:

The invention claimed is:

1. In an article of manufacture, which is a fishing hook which is disintegrated from but is otherwise connectable to a fishing lure or other tackle and has a shaft portion, a bend portion connected to the shaft portion, and a barb or point at the terminus of the bend portion, thus itself not being a fishing lure to include a fishing lure in imitation of an insect or part of an insect to include an insect body, the improvement comprising where the hook is made of a suitable material, which permits transmittance of light therethrough and is colored a color, selected from the group consisting of red, orange, yellow, green, blue and purple, in nature, and which is bare, and has a color quality which has been previously determined to be less attractive to a fish under conditions of clarity of water to be fished and of light transmittance at a depth where the fishing hook is to be placed in the water, than indicated by the following correlation for fish-attractive non-fluorescent colors:

| WATER CONDI-TION | % LIGHT TRANSMITTANCE, THAT IS, LIGHT INTENSITY AT FISHING DEPTH AS A PERCENTAG EOF LIGHT INTENSITY AT SURFACE ON A CLEAR NOON SUMMER DAY | | | | |
|---|---|---|---|---|---|
| | 0% | 10% | 20% | 30% | 40% |
| Clear: | Black | White | Yellow Blue | Blue | Purple |
| Stained: | Black | White Black | Black Yellow | Gold | Orange |
| Muddy: | Black | Orange | Yellow | Yellow Silver | Silver White |
| | 50% | 60% | 70% | 80% | 90% | 100% |
| Clear: | Silver Green | Green | Gray | Gold | Red | Red |
| Stained: | Red | Silver | Blue | Purple Green | Green | Gray |
| Muddy: | Red | Red | Green | Gray | Purple | Black | such that under such conditions, in general: the selected hook is less attractive to a fish than another color above, and a chance for an undesirable sighting of the hook by the fish can be lessened.

2. The hook of claim 1, wherein the shaft portion comprises a squarelike shaft portion.

3. The hook of claim 1, which is the red color.

4. The hook of claim 1, which is the orange color.

5. The hook of claim 1, which is the with mol.

6. The hook of claim 1, which is the green color.

7. The hook of claim 1, which is the blue color.

8. The hook of claim 3, which is the purple color.

9. An article of manufacture comprising a fishing hook, which is bare and disintegrated from but is otherwise connectable to a fishing lure or other tackle, and has a shaft portion, a bend portion connected to the shaft portion, and a barb or point at the terminus of the bend portion, thus itself not being a fishing lure to include a fishing lure in imitation of an insect or part of an insect to include an insect body, and which is made of a suitable material, which is opaque and colored a color, selected from the group consisting of white that is not silvery white, orange and green, in nature, and which has a color quality which has been previously determined to be less attractive to fish under conditions of clarity of water to be fished and of light transmittance at a depth where the fishing hook is to be placed in the water, than indicated by the following correlation for fish-attractive non-fluorescent colors:

| WATER CONDITION | % LIGHT TRANSMITTANCE, THAT IS, LIGHT INTENSITY AT FISHING DEPTH AS A PERCENTAGE OF LIGHT INTENSITY AT SURFACE ON A CLEAR NOON SUMMER DAY | | | | | | | | | | |
|---|---|---|---|---|---|---|---|---|---|---|---|
| | 0% | 10% | 20% | 30% | 40% | 50% | 60% | 70% | 80% | 90% | 100% |
| Clear: | Black | White | Yellow Blue | Blue | Purple | Silver Green | Green | Gray | Gold | Red | Red |
| Stained: | Black | White Black | Black Yellow | Gold | Orange | Red | Silver | Blue | Purple Green | Green | Gray |
| Muddy: | Black | Orange | Yellow | Yellow Silver | Silver White | Red White | Red Gold | Green | Gray Blue | Purple | Black | such that under such conditions, in general: the selected hook is less attractive to a fish than another color above, and a chance for an undesirable sighting of the hook by the fish can be lessened.

10. The hook of claim 9, which is colored the white that is not silvery white color.

11. The hook of claim 10, which is made with metal.

12. The hook of claim 9, which is colored the orange color.

13. The hook of claim 12, which is made with metal.

14. The hook of claim 9, which is colored the green color.

15. The hook of claim 14, which is made with metal.

16. A method to catch fish, comprising steps of (1) observing clarity of water to be fished to determine whether the water is clear, stained or muddy, (2) measuring light transmittance at a depth in the water where a fishing hook is to be placed, and then (3) selecting a color of the fishing hook to be used by matching the observed water conditions ((1) and (2)) with a color which has been previously determined by the following correlation:

| Water Condition | % Light Transmittance, i.e., light intensity at fishing depth as a percentage of light intensity at surface on a clear noon summer day |
|---|---|
| Muddy: | low to mid level % transmittance - Purple/Blue |
| | mid level % transmittance - Orange |
| | mid to upper level % transmittance - Orange/Yellow |
| Stained: | low to mid level % transmittance - Green/Green-Yellow |
| | mid to upper level % transmittance - Green/Yellow |
| | upper level % transmittance - Clear |
| Clear: | low to mid level % transmittance - Green/Red |
| | mid level % transmittance - Red |
| | mid to mid-upper level % transmittance - Yellow |
| | high-upper level % transmittance - Blue; | then attaching the selected hook to a fishing line, then placing the attached, selected hook in the depth in the water where fishing is to take place, and then catching the fish with the attached, selected hook, wherein the fishing hook used is disintegrated from but is otherwise connectable to a fishing lure or other tackle and has a shaft portion, a bend portion connected to the shaft portion, and a barb or point at the terminus of the bend, and wherein the fishing hook used is made of a suitable material, which permits transmittance of light therethrough and is colored.

17. The method of claim 16, wherein a fisherman is thus allowed to set a visibly more alluring bait configuration with the fishing hook used, and wherein the fishing hook used is not connected to a fishing lure and is baited.

18. A method to catch fish, comprising steps of (1) observing clarity of water to be fished to determine whether the water is clear, stained or muddy, (2) measuring light transmittance at a depth in the water where a fishing hook is to be placed, and then (3) selecting a color of the fishing hook to be used by matching the observed water conditions ((1) and (2)) with a color which has been previously determined to be less attractive under said conditions than those pointed out by the following correlation for fish-attractive non-fluorescent colors:

| Water Condition | % Light Transmittance, ie.. light intensity at fishing depth as a percentage of light intensity at surface on a clear noon summer day | | | | | | | | | | |
|---|---|---|---|---|---|---|---|---|---|---|---|
| | 0% | 10% | 20% | 30% | 40% | 50% | 60% | 70% | 80% | 90% | 100% |
| Clear: | Black | White | Yellow Blue | Blue | Purple | Silver Green | Green | Gray | Gold | Red | Red |
| Stained: | Black | White Black | Black Yellow | Gold | Orange | Red | Silver | Blue | Purple Green | Green | Gray |
| Muddy: | Black | Orange | Yellow | Yellow Silver | Silver White | Red White | Red Gold | Green | Gray Blue | Purple | Black; | then attaching the selected colored hook to a fishing line, then placing the attached, selected, colored hook in the depth in the water where fishing is to take place, and then catching the fish with the attached, selected, colored hook.

19. The method of claim 18, wherein the fishing hook used is made of a suitable material, which permits transmittance of light therethrough, and is disintegrated from but otherwise connectable to a fishing lure or other tackle and having a shaft portion, a bend portion connected to the shaft portion, and a barb or point at the terminus of the bend portion.

20. The method of claim 19, wherein the fishing hook used is not connected to a fishing lure and is baited.

21. The method of claim 20, wherein the fishing hook used is selected to be orange.

22. The method of claim 20, wherein the fishing hook used is selected to be red.

23. The method of claim 18, wherein the fishing hook used is selected to be orange, to be opaque, and to be disintegrated from but otherwise connectable to a fishing lure or other tackle and having a shaft portion, a bend portion connected to the shaft portion, and a barb or point at the terminus of the bend portion; is not connected to a fishing lure, and is baited.

24. The method of claim 18, wherein the fishing hook used is selected to be green, to be opaque, and to be disintegrated from but otherwise connectable to a fishing lure or other tackle and having a shaft portion, a bend portion connected to the shaft portion, and a barb or point at the terminus of the bend portion; is not connected to a fishing lure, and is baited.

25. The method of claim 18, wherein the fishing hook used is selected to be red or white, to be opaque, and to be disintegrated from but otherwise connectable to a fishing lure or other tackle and having a shaft portion, a bend portion connected to the shaft portion, and a barb or point at the terminus of the bend portion; is not connected to a fishing lure, and is baited.

\* \* \* \* \*

UNITED STATES PATENT AND TRADEMARK OFFICE
CERTIFICATE OF CORRECTION

PATENT NO. : 11,406,092 B1
APPLICATION NO. : 07/425360
DATED : August 9, 2022
INVENTOR(S) : Christopher John Rudy It is certified that error appears in the above-identified patent and that said Letters Patent is hereby corrected as shown below:

On the Title Page

In the Reference Cited item (56), add the following:
U.S. PATENT DOCUMENTS

| | | |
|---|---|---|
| 59,893 A    | 11/1866 Crosby    | 43/43.16 |
| 356,661 A   | 1/1887  Pfaff     | 43/42.33 |
| 4,028,838 A | 6/1977 Flower     | 43/43.16 |
| 2,511,117 A | 6/1950  Loeb      | 43/42.37 |
| 4,599,820 A | 7/1986 Hill       | 43/4.5 |
| 4,693,028 A | 9/1987 Hill       | 43/4.5 |
| 2,924,046 A | 2/1960 Cummins    | 65/122 |
| 2,951,316 A | 9/1960  Slayter   | 65/122 |
| 3,162,522 A | 12/1964 Tingley   | 65/122 |
| 4,046,540 A | 9/1977  Lewis et al. | 65/122 |
| 1,980,483 A | 11/1934 Hill      | 260/2 |
| 3,641,870 A | 2/1972  Eig       | 89/15 |
| 4,083,896 A | 4/1978  Moran et al. | 260/876R |
| 4,137,351 A | 1/1979 Clodfelter | 428/36 |
| 4,195,144 A | 3/1980  Mertwoy et al. | 526/173 |
| 4,366,289 A | 12/1982 Keskkula et al. | 525/78 |
| 4,505,972 A | 3/1985 Moore et al. | 428/220 |
| 4,517,339 A | 5/1985 Aliberto et al. | 525/85 |
| 4,603,160 A | 7/1986 Leonard    | 524/127 |
| 4,636,458 A | 1/1987 Wenzel et al. | 430/270 |
| 4,647,632 A | 3/1987 Priddy     | 526/88 |
| 4,650,821 A | 3/1987 Leonard    | 524/127 |
| 4,680,341 A | 7/1987 Newman-Evans | 525/113 |
| 4,696,978 A | 9/1987 Dean       | 525/205 |
| 4,696,992 A | 9/1987 Goel       | 528/90 |
| 4,696,993 A | 9/1987 Ude et al. | 528/167 |

Signed and Sealed this
Ninth Day of April, 2024

Katherine Kelly Vidal
*Director of the United States Patent and Trademark Office*

| | | |
|---|---|---|
| 4,696,995 A | 9/1987 Peters | 528/206 |
| 4,178,342 A | * 12/1979 Klein | 43/44.83 |
| 3,879,883 A | * 4/1975 Strader | 43/42.32 |
| 2,992,507 A | * 7/1961 Gray | 43/44.83 |
| 2,255,793 A | * 9/1941 Kridler | 43/44.83 |
| 2,180,557 A | * 11/1939 Skoverski | 43/44.83 |
| 1,055,104 A | * 3/1913 Van Norschall | 43/43.16 |
| 319,655 A | * 6/1885 Wright | 43/44.83 |

FOREIGN PATENT DOCUMENTS

| | | |
|---|---|---|
| FR 726,188 | * 5/1932 | 43/44.83 |
| GB 7,397 | * 1888 | 43/44.83 |

OTHER DOCUMENTS
Eagle Claw® News Gazette, Wright & McGill Co., Denver, Colorado, U.S.A. (1988) 12 pp.
The Washington Post and Times Herald, April 30, 1950, page A-25.

In the Specification

Column 1, about Line 51, delete the phrase, "of times," and insert the word, --oftimes,-- therefor.

Column 2, about Lines 40-41, delete the phrase, "OF SOME INVENTION EMBODIMENTS," leaving the word, "DRAWINGS," therefor.

In the Claims

In Claim 1, Column 8, about Line 16, delete the recitation, "PERCENTAG EOF," and insert the words, --PERCENTAGE OF,-- therefor.

In Claim 1, Column 8, immediately after Line 31, under the first occurrence of the word, "Red," insert the word, --White--; under the second occurrence of the word, "Red," insert the word, --Gold--; and under the word, "Gray," insert the word, --Blue,-- so that portion of the claim reads as set forth below.

Muddy: Red  Red  Green  Gray  Purple  Black
        White Gold       Blue In Claim 5, Column 8, about Line 44, delete the recitation, "with mol." insert therefor, --yellow color.--.

In Claim 8, Column 8, about Line 47, delete the numeral, "3," and insert the numeral, --1,-- therefor.